(12) United States Patent
Zhou et al.

(10) Patent No.: US 11,658,777 B2
(45) Date of Patent: May 23, 2023

(54) UNIFIED HARQ ID FOR MULTIPLE FREQUENCY CHANNELS

(71) Applicant: QUALCOMM Incorporated, San Diego, CA (US)

(72) Inventors: Yan Zhou, San Diego, CA (US); Xiaoxia Zhang, San Diego, CA (US); Tao Luo, San Diego, CA (US); Hamed Pezeshki, San Diego, CA (US); Konstantinos Dimou, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 16/920,240

(22) Filed: Jul. 2, 2020

(65) Prior Publication Data

US 2021/0006367 A1    Jan. 7, 2021

Related U.S. Application Data

(60) Provisional application No. 62/871,123, filed on Jul. 6, 2019.

(51) Int. Cl.
*H04L 1/18* (2023.01)
*H04W 72/04* (2023.01)
(Continued)

(52) U.S. Cl.
CPC ....... *H04L 1/1861* (2013.01); *H04W 72/0453* (2013.01)

(58) Field of Classification Search
CPC .......................... H04L 1/1861; H04W 72/0453
See application file for complete search history.

(56) References Cited

U.S. PATENT DOCUMENTS

2011/0205996 A1\* 8/2011 Kim ...................... H04W 28/06
                                                                    370/329
2017/0311337 A1\* 10/2017 Mo ........................ H04W 72/12
(Continued)

FOREIGN PATENT DOCUMENTS

WO    WO-2010050688 A2    5/2010

OTHER PUBLICATIONS

CMCC: "DL HARQ Transmission for LAA", 3GPP Draft, 3GPP TSG-RAN WG2 Meeting #89Bis, R2-151537 HARQ Retransmission, 3rd Generation Partnership Project (3gpp), Mobile Competence Centre, 650, Route Des Lucioles, F-06921 Sophia-Antipolis Cedex, France, vol. RAN WG2, no. Bratislava, Slovakia Apr. 19, 2015 (Apr. 19, 2015), XP050936454, pp. 1-4, Retrieved from the Internet: URL: http://www.3gpp.org/ftp/Meetings_3GPP_SYNC/RAN2/Docs/[retrieved on Apr. 19, 2015].
(Continued)

*Primary Examiner* — Walli Z Butt
*Assistant Examiner* — Thad N Defauw
(74) *Attorney, Agent, or Firm* — Norton Rose Fullbright US LLP

(57) ABSTRACT

In one aspect, a method of wireless communication includes transmitting, by a wireless communication device, a negative acknowledgement message (NACK) for a first Physical Downlink Shared Channel (PDSCH) via a first frequency band; and receiving, by the wireless communication device, a second PDSCH via a second frequency band, wherein the first frequency band is different from the second frequency band. Other aspects and features are also claimed and described.

30 Claims, 9 Drawing Sheets

(51) Int. Cl.
 *H04L 1/1829* (2023.01)
 *H04W 72/0453* (2023.01)

(56) References Cited

U.S. PATENT DOCUMENTS

| | | |
|---|---|---|
| 2018/0077696 A1* | 3/2018 | Lee .................. H04W 74/0833 |
| 2019/0150150 A1* | 5/2019 | Calin ................ H04W 72/0453 |
| | | 370/329 |
| 2019/0208509 A1* | 7/2019 | Takeda ................. H04L 1/1829 |
| 2019/0254012 A1 | 8/2019 | Seo et al. |
| 2021/0037554 A1 | 2/2021 | Kim et al. |
| 2022/0166541 A1 | 5/2022 | Takeda et al. |

OTHER PUBLICATIONS

International Search Report and Written Opinion—PCT/US2020/040802—ISA/EPO—dated Oct. 1, 2020 (193725WO).

* cited by examiner

UNIFIED HARQ ID FOR MULTIPLE FREQUENCY CHANNELS

CROSS-REFERENCE TO RELATED APPLICATIONS

This application claims the benefit of U.S. Provisional Patent Application No. 62/871,123, entitled, "UNIFIED HARQ ID FOR MULTIPLE FREQUENCY CHANNELS," filed on Jul. 6, 2019, which is expressly incorporated by reference herein in its entirety.

TECHNICAL FIELD

Aspects of the present disclosure relate generally to wireless communication systems, and more particularly, to cross carrier retransmission. Certain embodiments of the technology discussed below can enable and provide cross carrier retransmission for different frequency bands.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes transmitting, by a wireless communication device, a negative acknowledgement message (NACK) for a first Physical Downlink Shared Channel (PDSCH) via a first frequency band, and receiving, by the wireless communication device, a second PDSCH via a second frequency band, wherein the first frequency band is different from the second frequency band.

In an additional aspect of the disclosure, a method of wireless communication includes receiving, by a wireless communication device, a negative acknowledgement message (NACK) for a first Physical Downlink Shared Channel (PDSCH) via a first frequency band, and transmitting, by the wireless communication device, a second PDSCH via a second frequency band, wherein the first frequency band is different from the second frequency band.

In an additional aspect of the disclosure, an apparatus configured for wireless communication is disclosed. The apparatus includes means for transmitting, by a wireless communication device, a negative acknowledgement message (NACK) for a first Physical Downlink Shared Channel (PDSCH) via a first frequency band, and means for receiving, by the wireless communication device, a second PDSCH via a second frequency band, wherein the first frequency band is different from the second frequency band.

In an additional aspect of the disclosure, an apparatus configured for wireless communication is disclosed. The apparatus includes means for receiving, by a wireless communication device, a negative acknowledgement message (NACK) for a first Physical Downlink Shared Channel (PDSCH) via a first frequency band, and means for transmitting, by the wireless communication device, a second PDSCH via a second frequency band, wherein the first frequency band is different from the second frequency band.

In an additional aspect of the disclosure, a non-transitory computer-readable medium having program code recorded thereon. The program code further includes code to transmit, by a wireless communication device, a negative acknowledgement message (NACK) for a first Physical Downlink Shared Channel (PDSCH) via a first frequency band, and receive, by the wireless communication device, a second PDSCH via a second frequency band, wherein the first frequency band is different from the second frequency band.

In an additional aspect of the disclosure, a non-transitory computer-readable medium having program code recorded thereon. The program code further includes code to receive, by a wireless communication device, a negative acknowledgement message (NACK) for a first Physical Downlink Shared Channel (PDSCH) via a first frequency band, and transmit, by the wireless communication device, a second PDSCH via a second frequency band, wherein the first frequency band is different from the second frequency band.

In an additional aspect of the disclosure, an apparatus configured for wireless communication is disclosed. The apparatus includes at least one processor, and a memory coupled to the processor. The processor is configured to transmit, by a wireless communication device, a negative acknowledgement message (NACK) for a first Physical Downlink Shared Channel (PDSCH) via a first frequency band, and receive, by the wireless communication device, a second PDSCH via a second frequency band, wherein the first frequency band is different from the second frequency band.

In an additional aspect of the disclosure, an apparatus configured for wireless communication is disclosed. The apparatus includes at least one processor, and a memory coupled to the processor. The processor is configured to receive, by a wireless communication device, a negative acknowledgement message (NACK) for a first Physical Downlink Shared Channel (PDSCH) via a first frequency band, and transmit, by the wireless communication device, a second PDSCH via a second frequency band, wherein the first frequency band is different from the second frequency band.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
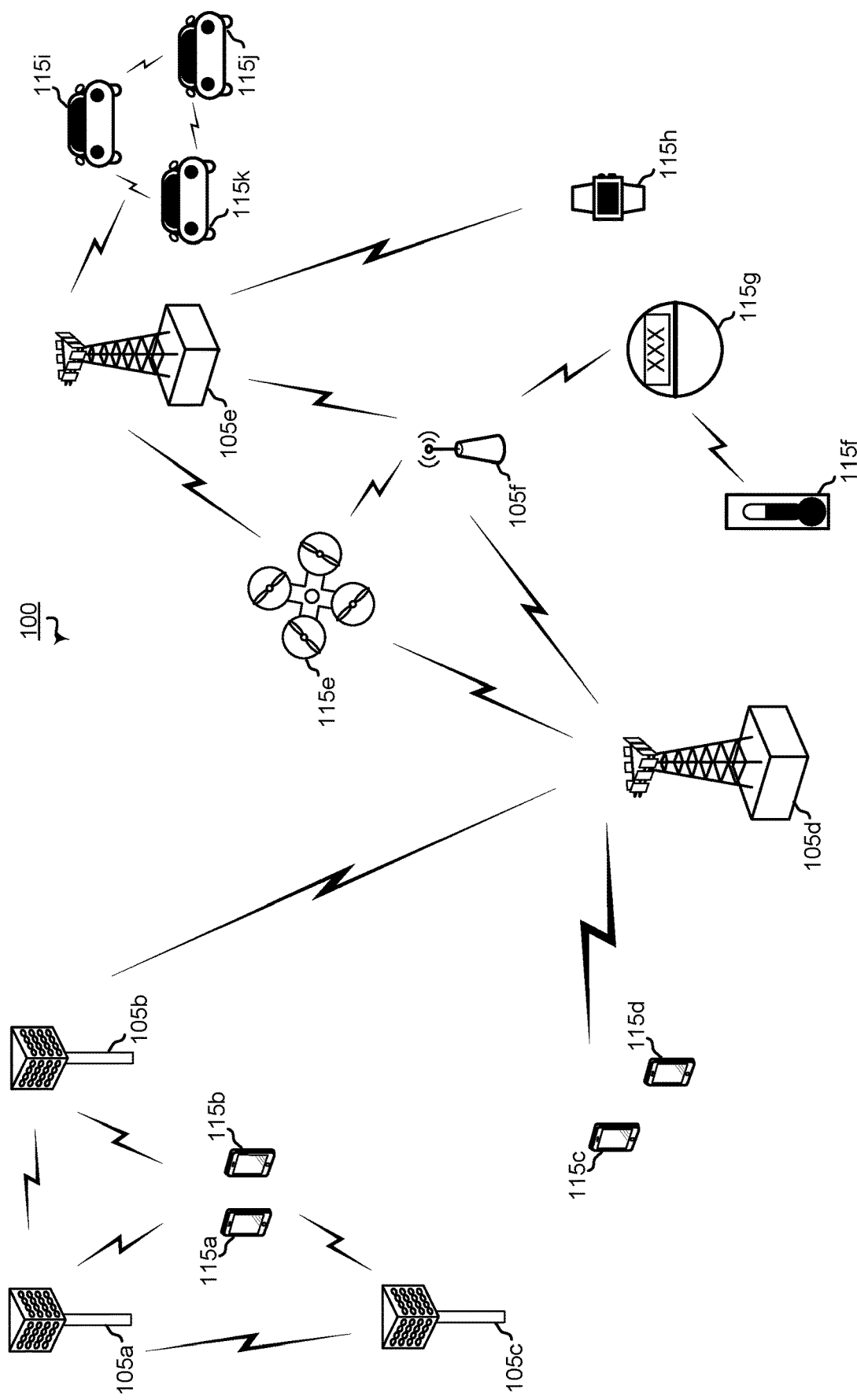
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
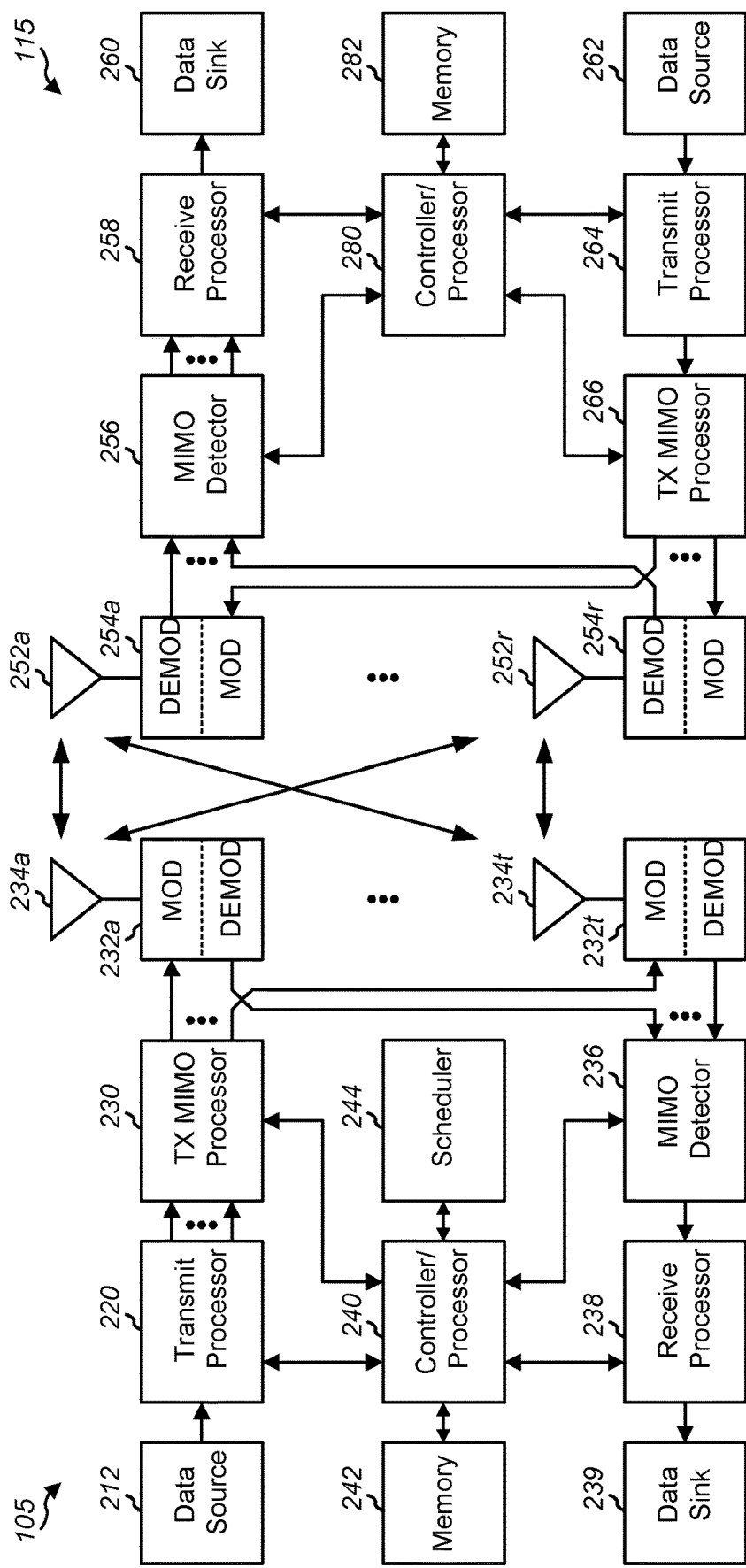
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 7 and 8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
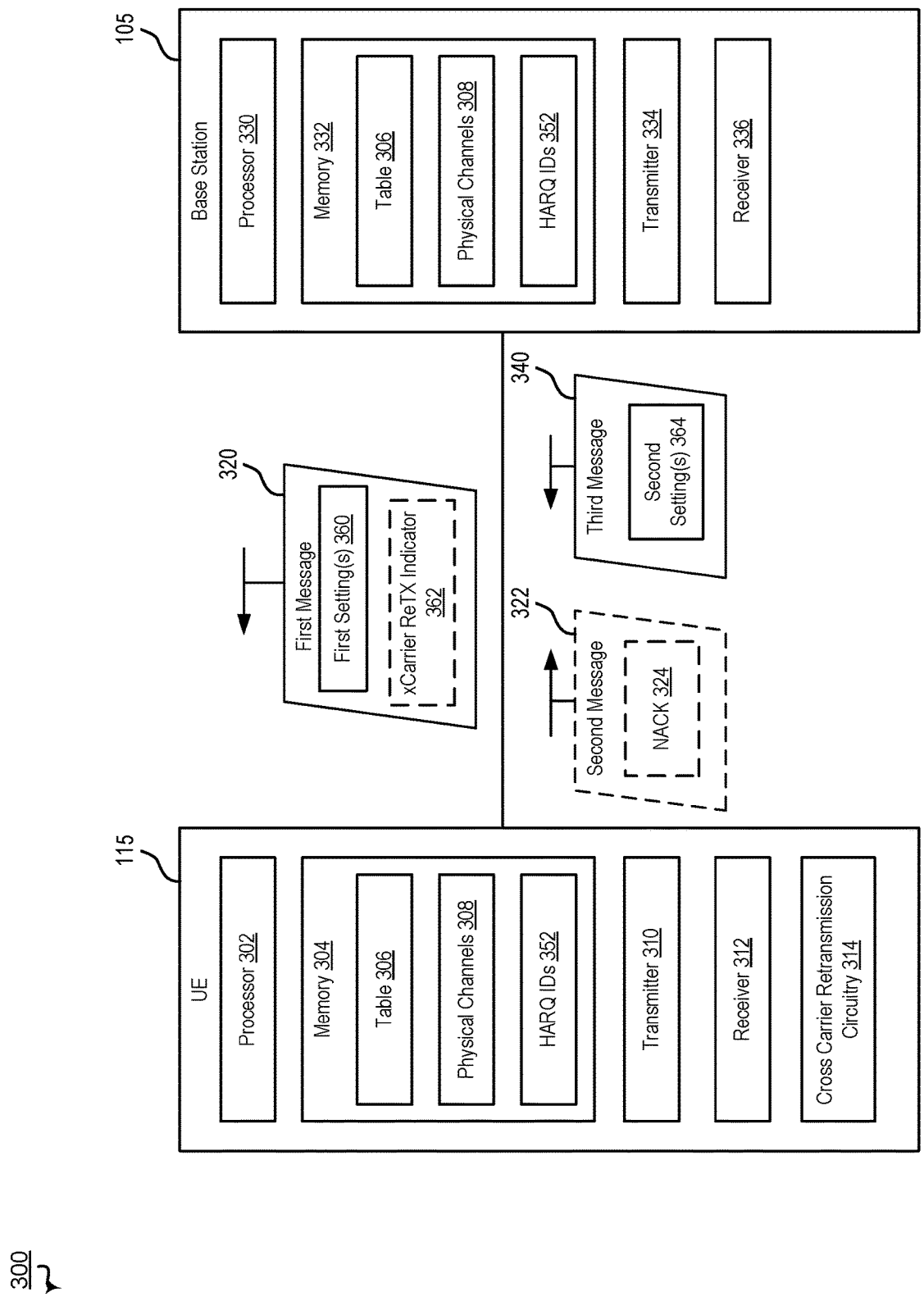
FIG. 3 is a block diagram illustrating an example of a wireless communications system that enables cross carrier retransmission in accordance with aspects of the present disclosure.

FIG. 3 illustrates an example of a wireless communications system 300 that supports cross carrier retransmission in accordance with aspects of the present disclosure. To illustrate, a retransmission of a particular message, such as PDSCH, may be sent on a different carrier then where the original transmission was sent and was failed to be received. That is a retransmission may be scheduled for another frequency band that is different from the first frequency band where the transmission was not received successfully.

In some examples, wireless communications system 300 may implement aspects of wireless communication system 100. For example, wireless communications system 300 may include UE 115 and base station 105. Although one UE and one base station are illustrated, in other implementations, wireless communications system 300 may include multiple UEs 115, multiple base stations 105, or both. Cross carrier retransmission on different frequency bands (i.e., inter-frequency band cross carrier retransmission) may enable increased reliability when sending retransmissions and thus may increase throughput, as compared to cross carrier retransmission on different channels of the same frequency band (i.e., intra-frequency band cross carrier retransmission). Cross carrier retransmission on different frequency bands may further be utilized to increase reliability, and possibly throughput when interference or blockage is present on or more carriers (e.g., channels or CCs) of a particular frequency band.

UE 115 includes processor 302, memory 304, transmitter 310, receiver 312, and channel measurement circuitry 314. Processor 302 may be configured to execute instructions stored at memory 304 to perform the operations described herein. In some implementations, processor 302 includes or corresponds to controller/processor 280, and memory 304 includes or corresponds to memory 282. Memory 304 may also be configured to store a table 306, physical channels 308, HARQ IDs 352, or a combination thereof, as further described herein.

The table 306 may include or correspond to a table (e.g., a mapping table) to which indicates a particular physical channel of the physical channels 308, a particular HARQ ID of the HARQ IDs 352, or both. The physical channel and/or HARQ ID may be identified based on settings of a message (e.g., first settings 360 of first message 320), a cross carrier retransmission indicator, such as cross carrier retransmission indicator 362 of first message 320, or both. Each physical channel of the one or more physical channels 308 may have corresponding scheduling information and/or transmission information for scheduling retransmissions. To illustrate, the scheduling information may include when and where the retransmissions are located. As another illustration, the transmission information may include the transmission and/or reception characteristics for transmitting/receiving the retransmissions, such as BWP ID, beam sweep enabled, beam sweep pattern, etc.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of UE 115 described with reference to FIG. 2.

Cross carrier retransmission circuitry 314 is configured to perform one or more cross carrier retransmission operations described herein, such as control activation of retransmission, processing of cross carrier retransmission indicators (e.g., 362), identifying physical channels for retransmissions, identifying HARQ IDs for retransmissions, or a combination thereof. Although illustrated as separate from processor 302, transmitter 310, and receiver 312, cross carrier retransmission circuitry 314 may include or correspond to such components.

Base station 105 includes processor 330, memory 332, transmitter 334, and receiver 336. Processor 330 may be configured to execute instructions stores at memory 332 to perform the operations described herein. In some implementations, processor 330 includes or corresponds to controller/processor 240, and memory 332 includes or corresponds to memory 242. Memory 332 may be configured to store a table 306, physical channels 308, HARQ IDs 352, or a combination thereof, similar to the UE 115 and as further described herein.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of base station 105 described with reference to FIG. 2.

During operation of wireless communications system 300, a first message 320 is transmitted by the base station 105 via a first carrier or physical channel (e.g., a first frequency channel or a first component carrier (CC)) of a plurality of carriers). First message 320 may include or correspond to a configuration message or a PDSCH transmission.

As illustrated in FIG. 1, the first message 320 may include a cross carrier retransmission indicator 362. Cross carrier retransmission indicator 362 may indicate activation of retransmission or settings for future retransmissions. Alternatively, another message may include a cross carrier retransmission indicator 362. For example, a message prior to the first message 320 may include the cross carrier retransmission indicator 362, such as a configuration message. As another example, a message after the first message 320 may include the cross carrier retransmission indicator 362. To illustrate, a PDCCH which schedules a PDSCH retransmission may indicate that the scheduled PDSCH is a retransmission corresponding to a previous failed PDSCH via an included cross carrier retransmission indicator 362. Based on the cross carrier retransmission indicator 362, the UE 115 may initiate monitoring for cross carrier retransmissions. In some implementations, the cross carrier retransmission indicator 362 may be a single bit or bitmap (multiple bits), and the UE 115 may determine the physical channel and/or HARQ ID by using table 306. Additionally, or alternatively, the HARQ ID can be obtained from first settings 360 of the first message 320.

The UE 115 may determine a retransmission schedule for the retransmissions based on stored preferences or a cross carrier retransmission indicator 362. The UE 115 then may monitor for the retransmission based on the retransmission schedule.

Additionally, the UE 115 may transmit a response message to base station 105 in response to the first message 320. For example, the UE 115 may transmit a second message 322 (e.g., an acknowledgment message). If the UE 115 successfully decoded the first message 320, the UE 115 may transmit an positive acknowledgment (e.g., ACK). If the UE did not successfully decode the first message 320, the UE 115 may transmit a negative acknowledgment (e.g., NACK 324).

In such implementations where the first message 320 was not received and/or a NACK 324 was transmitted to the base station 105, the base station 105 may transmit a third message 340 (e.g., a retransmission, such as a PDSCH retransmission) according to the physical channel and/or HARQ ID indicated or identified by the UE 115. The third message 340 is transmitted on its own carrier or physical channel which is distinct from the carrier or physical channel of the first message 320, i.e., the carrier or physical channels are in different frequency bands.

In some implementations, the base station 105 transmits multiple third messages 340 (multiple retransmissions). In a particular implementation, the third messages 340 are identical, i.e., have the same settings and same data. In other implementations, one or more third messages of the third messages 340 may be different, e.g., have different transmission settings or different data, such as different payload data.

UE 115 monitors the identified physical channel and receives the third message 340. The UE 115 may transmit an acknowledgment message in response to successful receipt of a third message 340 to cease retransmission of the first message 320 as third messages 340.

Thus, FIG. 3 describes cross carrier retransmission for UE 115 and base station 105. Cross carrier retransmission enables a network to reduce latency and overhead and improve reliability by enabling more possible frequencies for retransmission, as compared to having retransmission only occur on the same channel or CC. Improving performance of such operations may improve throughput for communications on the network and enable use of mm wave frequency ranges and URLLC modes.

Figure 4:
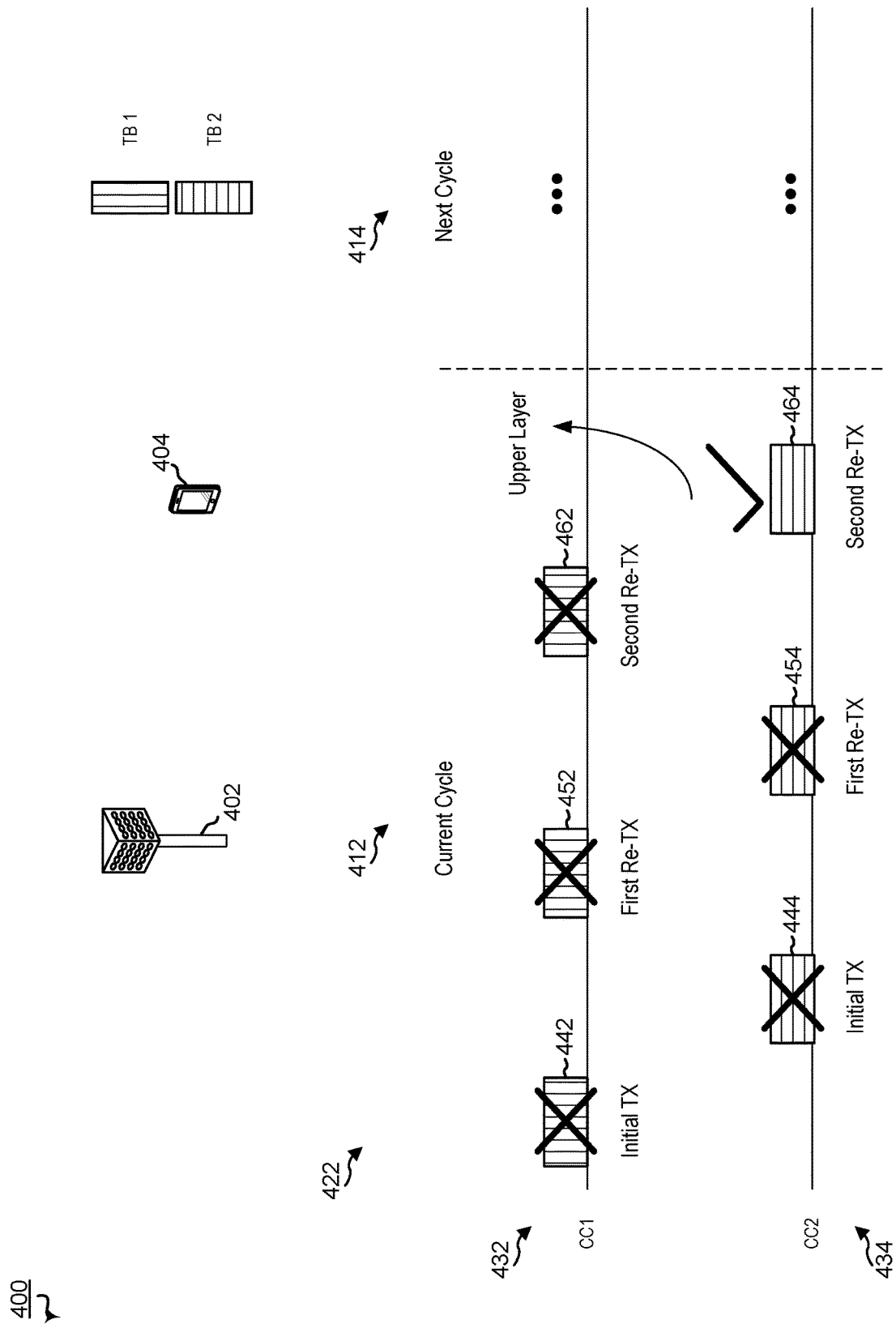
FIG. 4 is an example of a block diagram illustrating a portion of an NR network in which communications occur between a base station and UE.
Figure 5:
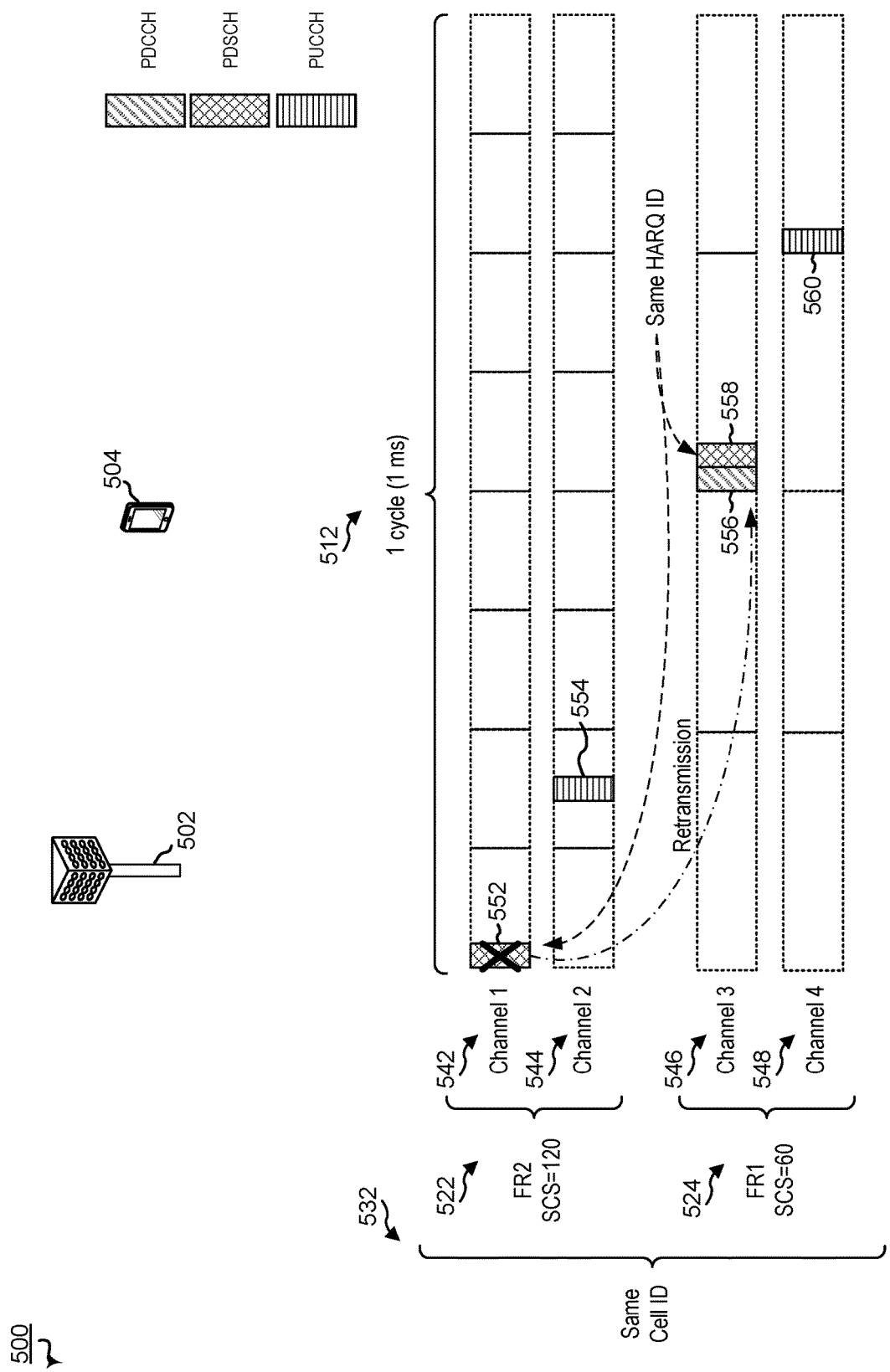
FIG. 5 is an example of a block diagram illustrating a portion of an NR network in which communications occur between a base station and UE each configured according to aspects of the present disclosure.
Figure 6:
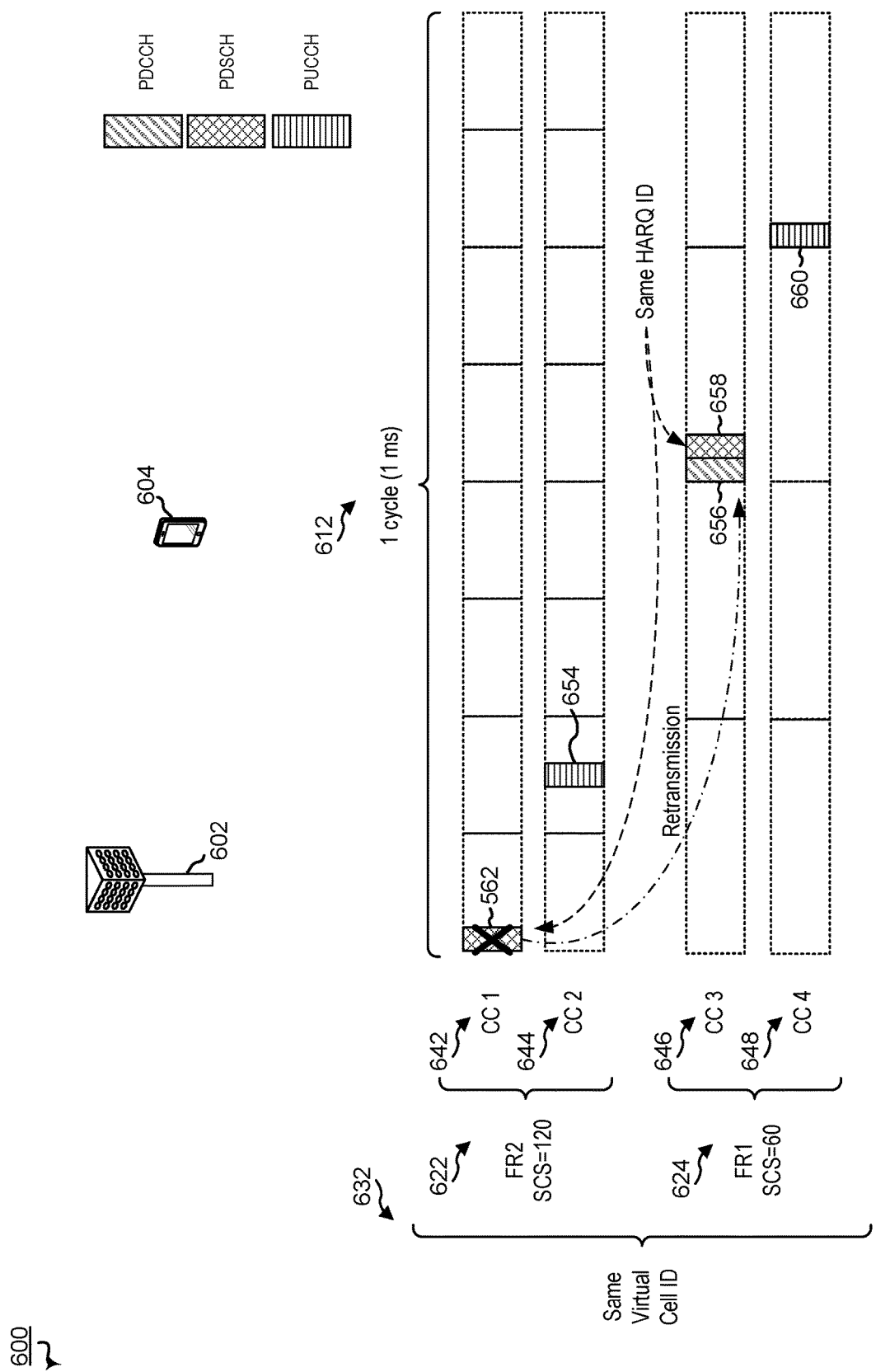
FIG. 6 is an example of a block diagram illustrating a portion of an NR network in which communications occur between a base station and UE each configured according to aspects of the present disclosure.

FIGS. 4-6 illustrate examples of carrier retransmission. FIG. 4 illustrates an example intra-carrier retransmission (i.e., same frequency band carrier retransmission). FIGS. 5 and 6 illustrate cross carrier retransmission over different frequency bands. FIG. 5 illustrates an example of cross carrier retransmission for frequency channels. FIG. 6 illustrates an example of cross carrier retransmission for component carriers (CCs).

Referring to FIG. 4, FIG. 4 illustrates a timing diagram 400 illustrating communications between a base station 402 and a UE 404. Base station 402 and UE 404 perform intra-carrier retransmission (i.e., same frequency band carrier retransmission) operations. However, if frequency band becomes blocked or congested, retransmissions on the same frequency band are not likely to be received.

Referring to timing diagram 400, multiple cycles (first cycle 412 and second cycle 414) are illustrated for a single frequency range (e.g., FR1 or FR2), a frequency range 422 (e.g., first frequency range). Also, two component carriers (CCs) are illustrated for the frequency range 422. Specifically, the frequency range 422 has a first CC 432 (e.g., CC 1) and a second CC 434 (e.g., CC 2).

In FIG. 4, the base station 402 transmits multiple transmissions via each CC. As illustrated in the example of FIG. 4, the transmissions are downlink transmissions, such as PDSCH transmissions. In the example of FIG. 4, multiple retransmissions are performed for each CC. To illustrate, base station 402 transmits PDSCH transmissions 442, 452, and 462 via the first CC 432 (e.g., a first carrier) and transmits PDSCH transmissions 444, 454, and 464 via the second CC 434 (e.g., a second carrier).

The PDSCH transmissions 442-464 may be acknowledged by corresponding acknowledgment messages (not shown in FIG. 4 but similar to acknowledgment messages and PUCCHs of FIGS. 5 and 6 and described further herein). Based on the receipt and transmission of PDSCH acknowledgment messages, the UE 404 and base station 402 may perform retransmission operations. For example, the base station 402 may schedule and/or transmit a retransmission responsive to receiving a negative acknowledgement (e.g., NACK) or to not receiving an acknowledgment for a corresponding previous (original) transmission or prior retransmission.

In the example of FIG. 4, the UE 404 and the base station 402 schedule retransmission on a per CC basis. Specifically, the base station 402 transmits and the UE 404 receives retransmissions of PDSCH 442 (e.g., first original PDSCH), i.e., first and second retransmissions PDSCH 452 and PDSCH 462, in the same CC, which is first CC 432, and the base station 402 transmits and the UE 404 receives retransmissions of PDSCH 444 (e.g., second original PDSCH), i.e., first and second retransmissions PDSCH 454 and PDSCH 464 in the same CC, which is second CC 434. The UE 404 may transmit acknowledgment messages for the PDSCHs, as described further herein. Retransmissions for a particular CC may cease upon successful reception and decoding of a retransmission, such as PDSCH 464. Accordingly, many retransmissions may be utilized on a CC that is blocked or congested until the blockage or congestion passes, as illustrated in FIG. 4.

Referring to FIG. 5, FIG. 5 illustrates a timing diagram 500 illustrating communications between a base station 502 and a UE 504. Base station 502 may perform cross carrier retransmission for a single cell having the same Cell ID. A cell (e.g., a single cell) may be defined with or to include/ encompass multiple frequency channels, which can be distributed in different bands (e.g., adjacent or discontinuous bands). Most (or all) of the frequency channels share the same set of HARQ IDs for combining. To illustrate, because multiple transmissions may have the same TB, CBG, and HARQ ID, the multiple transmissions can be dynamically transmitted (including retransmitted) on any frequency channel of the cell. Thus, a network can utilize more frequency channels to perform retransmission of a message. Accordingly, cross carrier retransmission may be performed faster, more reliably, and with reduced latency as compared to same frequency channel/CC retransmission as in FIG. 4.

In some implementations, each frequency channel may have its own (e.g., dedicated) uplink feedback frequency channel to send acknowledgement messages (e.g., A/N) for received downlink data. Additionally, or alternatively, multiple active BWPs can be allowed for a cell in this proposal, and they can be on different bands and/or frequency ranges.

Referring to timing diagram 500, a single cycle, first cycle 512, is illustrated for a multiple frequency ranges (e.g., FR1 or FR2), a first frequency range 522 and a second frequency range 524. As illustrated in FIG. 5, the first frequency range 522 is FR2 and has a sub carrier spacing (SCS) of 120 and the second frequency range 524 is FR1 and has a sub carrier spacing (SCS) of 60. Also, two frequency channels are illustrated for each frequency range 522, 524. Specifically, the first frequency range 522 has a first frequency channel 542 (e.g., Channel 1) and a second frequency channel 544 (e.g., Channel 2), and the second frequency range 524 has a first frequency channel 546 (e.g., Channel 3) and a second frequency channel 548 (e.g., Channel 4). Both the first frequency range 522 and the second frequency range 524 have the same Cell ID, Cell ID 532. Accordingly, each frequency channel thereof also has the same Cell ID, Cell ID 532.

In FIG. 5, the base station 502 transmits a PDSCH 552 (e.g., first PDSCH) via the first frequency channel 542. The PDSCH 552 may be signaled by the base station 502 by a corresponding PDCCH (not shown, such as PDCCH 556) via first frequency channel 542. In the example of FIG. 5, the UE 504 is not able to successfully receive and/or decode the PDSCH 552. For example, there may be signal blockage on first frequency channel 542, interference, etc. In response to a PDSCH, such as PDSCH 552, UE 504 may transmit an acknowledgment message. In the example of FIG. 5, in response to not decoding PDSCH 552, the UE 504 transmits a negative acknowledgment message (NACK) in PUCCH 554 (e.g., first PUCCH) via second frequency channel 544. The NACK may be included in an uplink control message, such as Uplink Control Information (UCI).

Additionally, base station 502 and UE 504 determine to perform a retransmission of PDSCH 552 based on the successful reception of PDSCH 552. For example, responsive to receiving the NACK in PUCCH 554, the base station 502 determines to initiate a retransmission of the PDSCH 552. Base station 502 determines to retransmit a PDSCH 558 (e.g., second PDSCH or PDSCH retransmission) based on the NACK. For example, base station 502 determines to retransmit the PDSCH 558 via the third frequency channel 546 in the second frequency range 524 based on the NACK, settings of PDCCH which scheduled the PDSCH, a cross carrier retransmission indicator (e.g., 362), a prior configuration message (e.g., RRC message), a PDCCH for the retransmission, or a combination thereof. The PDSCH 552 and the PDSCH 558 have the same HARQ ID to enable unified HARQ feedback across carriers. In some implementations, PDSCH 552 and PDSCH 558 have the same active bandwidth part (BWP) (e.g., same size bandwidth and/or location within the cell/channel), and in other implementations, PDSCH 552 and PDSCH 558 have different active BWPs (e.g., different size bandwidth and/or location within the cell/channel). Additionally, the PDSCH 552 and the PDSCH 558 may have the same transport block (TB), the same code block group (CBG), or both.

The base station 502 signals the PDSCH 558 (e.g., retransmission of PDSCH 552) to the UE 504 by transmitting a PDCCH 556. In FIG. 5, the PDCCH 556 is transmitted via the third frequency channel 546. In the example in FIG. 5, the UE 504 successfully decodes the PDSCH 558 and transmits a second acknowledgment message in response in PUCCH 560 (e.g., second PUCCH) via fourth frequency channel 548. As illustrated in FIG. 5, in response to decoding PDSCH 558, the UE 504 sends a positive acknowledgment message (ACK) in PUCCH 560. The ACK may be included in an uplink control message, such as a UCI. The base station 502 may not retransmit other PDSCHs for the PDSCH 552 (e.g., may cease retransmission) based on the PUCCH 560 (e.g., ACK thereof).

Because the base station 502 and UE 504 perform cross carrier retransmission, such as on a different frequency band, blockage or congestion on a particular channel may not affect retransmissions. Accordingly, reliability may be increased and latency and overhead may be decreased.

Referring to FIG. 6, FIG. 6 illustrates a timing diagram 600 illustrating communications between a base station 602 and a UE 604. As compared to FIG. 5, which has a same Cell ID, FIG. 6 corresponds to a same virtual cell ID. For example, a virtual Cell ID can be defined and may include multiple actual cells, such as CCs. Base station 602 may perform cross carrier retransmission for multiple actual cells comprising the same virtual cell or having the same virtual Cell ID. Multiple (or all) actual cells under the same virtual cell ID may share the same set of HARQ IDs for combining transmissions (e.g., retransmissions). Thus, a network can utilize more of CCs to perform retransmission of a message. Accordingly, cross carrier retransmission may be performed faster, more reliably, and with reduced latency as compared to same CC retransmission as in FIG. 4.

Referring to timing diagram 600, a single cycle, first cycle 612, is illustrated for a multiple frequency ranges (e.g., FR1 or FR2), a first frequency range 622 and a second frequency range 624. As illustrated in FIG. 6, the first frequency range 622 is FR2 and has a sub carrier spacing (SCS) of 120 and the second frequency range 624 is FR1 and has a sub carrier spacing (SCS) of 60. Also, two component carriers (CCs) are illustrated for each frequency range 622, 624. Specifically, the first frequency range 622 has a first CC 642 (e.g., CC 1) and a second CC 644 (e.g., CC 2), and the second frequency range 624 has a first CC 646 (e.g., CC 3) and a second CC 648 (e.g., CC 4). Both the first frequency range 622 and the second frequency range 624 have the same Virtual Cell ID, Virtual Cell ID 632. Accordingly, each CC thereof also has the same Virtual Cell ID, Virtual Cell ID 632.

During operation, the base station 602 transmits a PDSCH 652 (e.g., first PDSCH) via the first CC 642. The PDSCH 652 may be signaled by the base station 602 by a corresponding PDCCH (not shown, such as PDCCH 656) via first CC 642. In the example of FIG. 6, the UE 604 is not able to successfully receive and/or decode the PDSCH 652. For example, there may be signal blockage on first CC 642, interference, etc. In response to a PDSCH, such as PDSCH 652, UE 604 may transmit an acknowledgment message. In the example of FIG. 6, in response to not decoding PDSCH 652, the UE 604 transmits a negative acknowledgment message (NACK) in PUCCH 654 (e.g., first PUCCH) via second CC 644. The NACK may be included in an uplink control message, such as Uplink Control Information (UCI).

Additionally, base station 602 and UE 604 determine to perform a retransmission of PDSCH 652 based on the successful reception of PDSCH 652. For example, responsive to receiving the NACK in PUCCH 654, the base station 602 determines to initiate a retransmission of the PDSCH 652. Base station 602 determines to retransmit a PDSCH 658 (e.g., second PDSCH or PDSCH retransmission) based on the NACK. For example, base station 602 determines to retransmit the PDSCH 658 via the third CC 646 in the second frequency range 624 based on the NACK, a cross carrier retransmission indicator (e.g., 362), or both. The PDSCH 652 and the PDSCH 658 have the same HARQ ID to enable unified HARQ feedback across carriers. In some implementations, PDSCH 652 and PDSCH 658 have the same active bandwidth part (BWP) (e.g., same size bandwidth and/or location within the cell/channel), and in other implementations, PDSCH 652 and PDSCH 658 have different active BWPs (e.g., different size bandwidth and/or location within the cell/channel). Additionally, the PDSCH 652 and the PDSCH 658 may have the same transport block (TB), the same code block group (CBG), or both.

The base station 602 signals the PDSCH 658 to the UE 604 by transmitting a PDCCH 656. In FIG. 6, the PDCCH 656 is transmitted via the third CC 646. In the example in FIG. 6, the UE 604 successfully decodes the PDSCH 658 and transmits a second acknowledgment message in response in PUCCH 660 (e.g., second PUCCH) via fourth CC 648. As illustrated in FIG. 6, in response to decoding PDSCH 658, the UE 604 sends a positive acknowledgment message (ACK) in PUCCH 660. The ACK may be included in an uplink control message, such as a UCI. The base station 602 may not retransmit other PDSCHs for the PDSCH 652 (e.g., may cease retransmission) based on the PUCCH 660 (e.g., ACK thereof).

Although the cross carrier retransmissions are transmitted in two different frequency ranges in FIGS. 5 and 6, in other implementations cross carrier retransmissions may be transmitted in a single frequency range, such as FR1 or FR2. Additionally, or alternatively, although the uplink and downlink transmissions have dedicated physical channels in FIGS. 5 and 6, in other implementations corresponding uplink and downlink transmissions may be transmitted in a single shared physical channel, such as both 552/652 and 554/654 are transmitted in a first frequency channel/CC (e.g., 542/642 or 544/644), each of 556/656, 558/658, and 560/660 are transmitted in a second frequency channel/CC (e.g., 546/646 or 548/648), or a combination thereof. Furthermore, although adjacent frequency bands and frequency ranges are illustrated in in FIGS. 5 and 6, the frequency bands, the frequency ranges, or both may be discontinuous (e.g., not adjacent).

Furthermore, in any of cross carrier retransmission examples of FIGS. 5 and 6, the UE can still operate in same carrier retransmission mode for one or more carriers/channels, as in FIG. 4. For example, the UE can still use same carrier retransmission for FR1 and may use cross carrier retransmission for FR2 (e.g., retransmit on FR1 when FR2 transmission fails), as an illustrative, non-limiting example. Accordingly, the cross carrier retransmission operations described herein offer more flexibility with reduced overhead and enable cross carrier retransmission to be completed more quickly which may enable enhanced performance for 5G and/or URLLC modes.

Figures 7, 8:
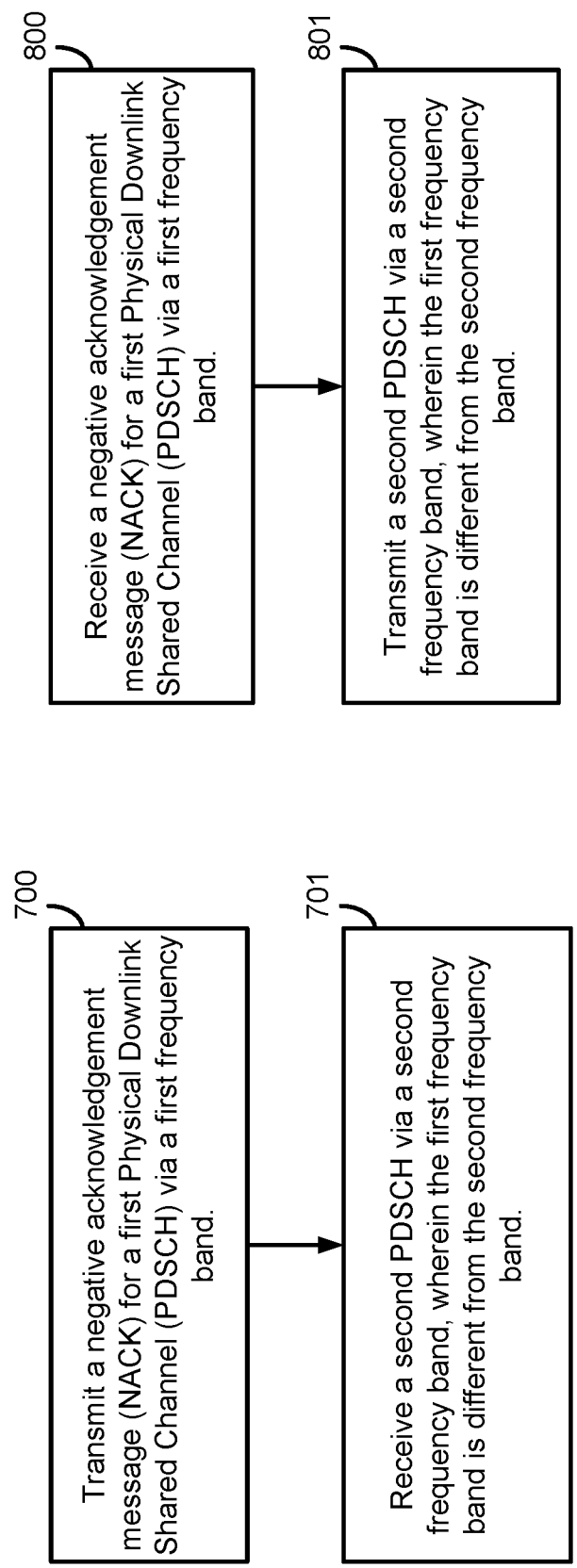
FIG. 7 is a block diagram illustrating example blocks executed by a UE configured according to an aspect of the present disclosure.
FIG. 8 is a block diagram illustrating example blocks executed by a base station configured according to an aspect of the present disclosure.
Figure 9:
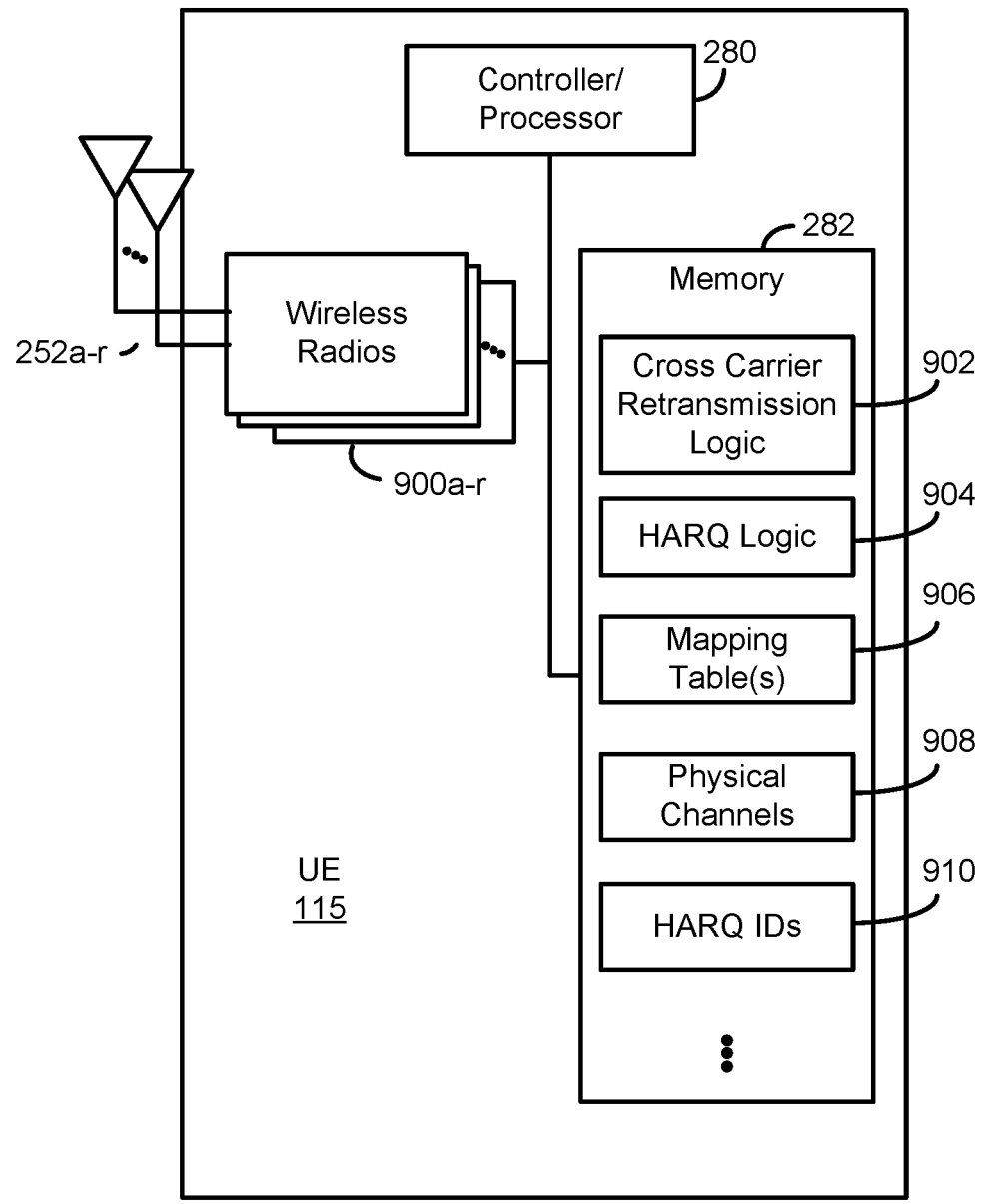
FIG. 9 is a block diagram conceptually illustrating a design of a UE according to some embodiments of the present disclosure.

FIG. 7 is a block diagram illustrating example blocks executed by a UE configured according to an aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900*a-r* and antennas 252*a-r*. Wireless radios 900*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 700, a mobile communication device, such as a UE, transmits a negative acknowledgement message (NACK) for a first Physical Downlink Shared Channel (PDSCH) via a first frequency band. A UE, such as UE 115, may execute, under control of controller/processor 280, cross carrier retransmission logic 902, stored in memory 282. The execution environment of cross carrier retransmission logic 902 provides the functionality for UE 115 to define and perform the cross carrier retransmission procedures. The execution environment of cross carrier retransmission logic 902 defines the different cross carrier retransmission processes. For example, UE 115 may not receive a scheduled transmission or may not successfully decode a scheduled transmission and may in response transmit a negative acknowledgement message (NACK) corresponding to the failed transmission via antennas 252*a-r* and wireless radios 900*a-r*. The UE 115 may indicate in the NACK or a previous message that is configured or capable for cross carrier retransmission, such as by cross carrier retransmission indicator.

At block 701, the UE receives a second PDSCH via a second frequency band, wherein the first frequency band is different from the second frequency band. The execution environment of the cross carrier retransmission logic 902 provides UE 115 the functionalities described with respect to the various aspects of the present disclosure, such as determining a schedule for one or more retransmissions of a failed transmission (incoming or downlink transmission). To illustrate, within the execution environment of cross carrier retransmission logic 902, UE 115, under control of controller/processor 280, may determine one or more physical channels and/or HARQ IDs based on mapping table(s) 906. As an illustrative example, mapping table 906 may enable identification of information for physical channels and/or HARQ IDs based on a cross carrier indicator (e.g., 362). Alternatively, mapping table 906 may include a map of corresponding physical channels for retransmissions. Thus, as an illustrative, non-limiting example, if a transmission fails on physical channel 22, mapping table 906 indicates to use physical channel 35 for retransmissions of failed transmissions on physical channel 22.

Once UE 115 determines the schedule and physical channel for the retransmission, UE 115 may monitor the physical channel and receive a retransmission corresponding to the failed transmission and NACK via wireless radios 900*a-r* and antennas 252*a-r*.

The UE 115 may execute additional blocks (or the UE 115 may be configured further perform additional operations) in other implementations. For example, the UE 115 may perform one or more operations described above. As another example, the UE 115 may perform one or more aspects as described below.

In a first aspect, the wireless communication device comprises a user equipment (UE); transmitting the NACK and receiving the second PDSCH are performed during a particular cycle; the NACK is transmitted via a first physical channel of the first frequency band; and the second PDSCH is received via a second physical channel of the second frequency band.

In a second aspect, alone or in combination with one or more of the above aspects, the first frequency band and the second frequency band are adjacent bands.

In a third aspect, alone or in combination with one or more of the above aspects, the first frequency band and the second frequency band are discontinuous bands.

In a fourth aspect, alone or in combination with one or more of the above aspects, the first frequency band and the second frequency band are in the same frequency range.

In a fifth aspect, alone or in combination with one or more of the above aspects, the first frequency band is in a first frequency range, and wherein the second frequency band is in a second frequency range different from the first frequency range.

In a sixth aspect, alone or in combination with one or more of the above aspects, the first frequency range comprises a millimeter wave frequency range, and wherein the second frequency range comprises a non-millimeter wave frequency range.

In a seventh aspect, alone or in combination with one or more of the above aspects, the first PDSCH and the second PDSCH have the same transport block (TB), the same code block group (CBG), the same HARQ ID, or a combination thereof.

In an eighth aspect, alone or in combination with one or more of the above aspects, prior to receiving the second PDSCH, the UE 115 receives, during the particular cycle, a first Physical Downlink Common Channel (PDCCH) indicating the first PDSCH, and unsuccessfully decodes the first PDSCH.

In a ninth aspect, alone or in combination with one or more of the above aspects, In a tenth aspect, alone or in combination with one or more of the above aspects, In an eleventh aspect, alone or in combination with one or more of the above aspects, prior to receiving the second PDSCH, the UE 115 receives a second PDCCH indicating the second PDSCH.

In a twelfth aspect, alone or in combination with one or more of the above aspects, after receiving the second PDSCH, the UE 115 successfully decodes the second PDSCH.

In a thirteenth aspect, alone or in combination with one or more of the above aspects, after decoding the first PDSCH, the UE 115 transmits an acknowledgement message for the second PDSCH on a fourth physical channel of the second frequency band.

In a fourteenth aspect, alone or in combination with one or more of the above aspects, after decoding the first PDSCH, the UE 115 transmits an acknowledgement message for the second PDSCH on the second physical channel.

In a fifteenth aspect, alone or in combination with one or more of the above aspects, each physical channel corresponds to a frequency channel, and wherein each frequency channel of each frequency band has same Cell ID.

In a sixteenth aspect, alone or in combination with one or more of the above aspects, each frequency band has a plurality of corresponding channels, wherein each frequency channel of each frequency band has the same set of HARQ IDs, wherein the plurality of channels have the same active bandwidth part configuration.

In a seventeenth aspect, alone or in combination with one or more of the above aspects, each frequency band has a plurality of corresponding channels, wherein each frequency channel of each frequency band has the same set of HARQ IDs, wherein the plurality of channels have two or more active bandwidth part configurations.

In an eighteenth aspect, alone or in combination with one or more of the above aspects, each physical channel corresponds to a component carrier (CC), and wherein each CC of each frequency band has same virtual Cell ID.

In a nineteenth aspect, alone or in combination with one or more of the above aspects, each frequency band has a plurality of corresponding CC's, wherein each CC of each frequency band has the same set of HARQ IDs, wherein the plurality of CCs have the same active bandwidth part configuration.

In a twentieth aspect, alone or in combination with one or more of the above aspects, each frequency band has a plurality of corresponding CC's, wherein each CC of each frequency band has the same set of HARQ IDs, wherein the plurality of CCs have two or more active bandwidth part configurations.

In a twenty-first aspect, alone or in combination with one or more of the above aspects, the UE operates in a same Cell ID mode in the first cycle, and further comprising, in a second cycle, operating, by the UE, in a same virtual Cell ID mode different from the same Cell ID mode.

In a twenty-second aspect, alone or in combination with one or more of the above aspects, prior to receiving the first PDSCH, the UE 115 transmits a message indicating that the UE is configured for unified HARD ID for cross carrier retransmission on different bands.

Accordingly, the UE and base station may use another physical channel to perform retransmission. Thus, blockage or congestion on a particular frequency band may be avoided and latency and overhead are reduced and throughput and reliability are increased.

Figure 10:
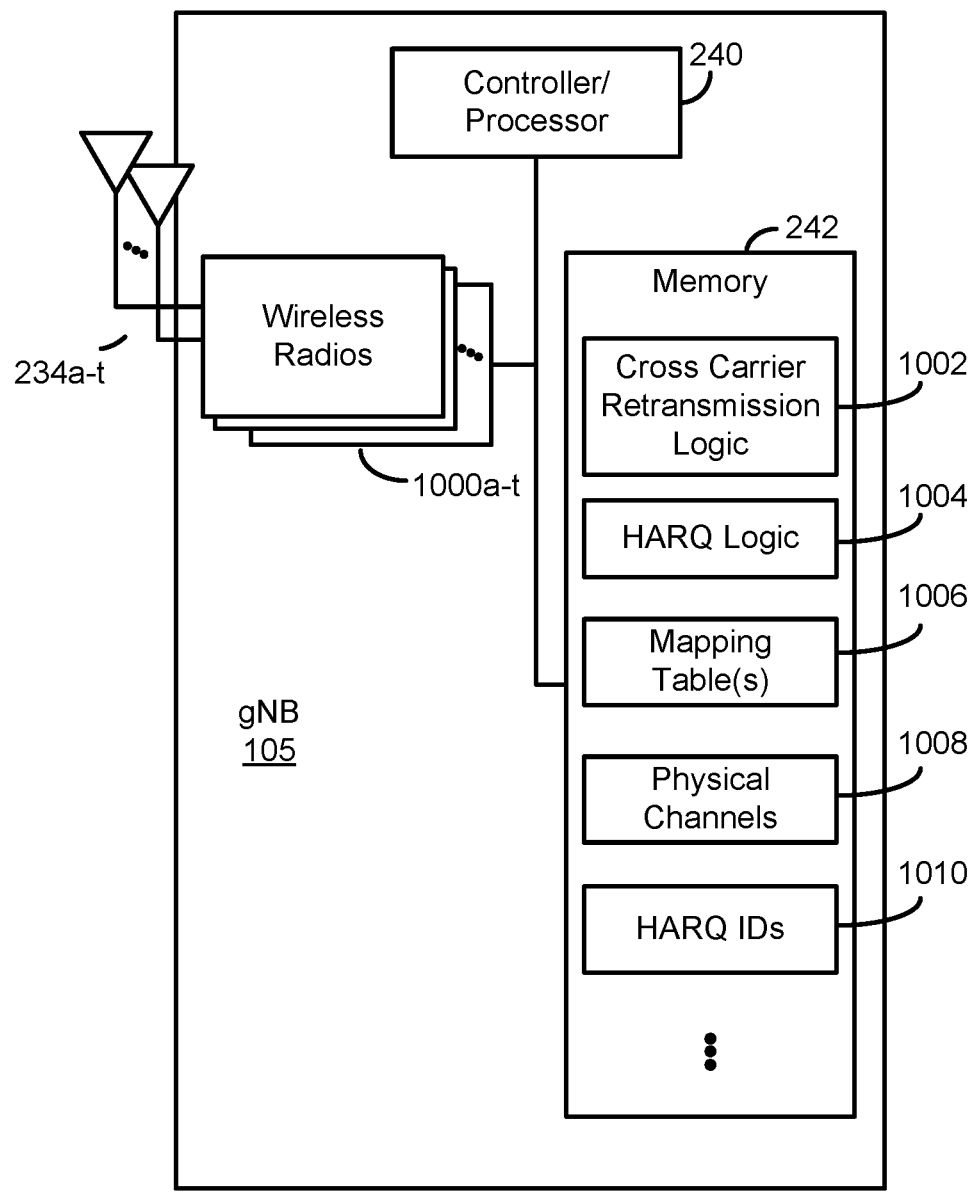
FIG. 10 is a block diagram conceptually illustrating a design of a base station configured according to some embodiments of the present disclosure.

FIG. 8 is a block diagram illustrating example blocks executed by a base station configured according to an aspect of the present disclosure. The example blocks will also be described with respect to gNB 105 (or eNB) as illustrated in FIG. 10. FIG. 10 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1000a-t and antennas 234a-r. Wireless radios 1000a-t includes various components and hardware, as illustrated in FIG. 2 for gNB 105, including modulator/demodulators 232a-t, MIMO detector 236, receive processor 238, transmit processor 220, and TX MIMO processor 230.

At block 800, a mobile communication device, such as a gNB, receives a negative acknowledgement message (NACK) for a first Physical Downlink Shared Channel (PDSCH) via a first frequency band. A gNB, such as gNB 105, may execute, under control of controller/processor 240, cross carrier retransmission logic 1002, stored in memory 242. The execution environment of cross carrier retransmission logic 1002 provides the functionality for gNB 105 to define and perform the cross carrier retransmission procedures. The data 1002-1010 in memory 242 may include or correspond to the data 902-910 in memory 282, respectively.

The execution environment of cross carrier retransmission logic 1002 defines the different cross carrier retransmission processes, such as signaling activation of cross carrier retransmission After gNB 105 generates and transmits a downlink message (e.g., a first transmission or original transmission) via antennas 234a-t and wireless radios 1000a-t, the gNB 105 may monitor for feedback via antennas 234a-t and wireless radios 1000a-t in a corresponding channel. Within the execution environment of the cross carrier retransmission logic 1002, gNB 105 receives a NACK via antennas 234a-t and wireless radios 1000a-t indicating that the downlink message transmission failed and was not received or decoded. The gNB 105 may determine to enter a cross carrier retransmission mode based on receiving the NACK or a cross carrier indicator of the NACK or a previous message.

At block 801, the gNB transmits a second PDSCH via a second frequency band, wherein the first frequency band is different from the second frequency band. The execution environment of cross carrier retransmission logic 1002 provides the functionality for gNB 105 to define and perform the cross carrier retransmission procedures. The gNB 105 may schedule the second PDSCH (or another type of downlink transmission) based on the cross carrier retransmission indicator or a stored configuration, such as mapping table 1006. The gNB 105 may identify a different frequency band to transmit the downlink retransmission (e.g., second PDSCH) or retransmissions and the gNB 105 transmits the downlink retransmission on a different frequency band than the first PDSCH and/or NACK.

The base station 105 may execute additional blocks (or the base station 105 may be configured further perform additional operations) in other implementations. For example, the base station 105 may perform one or more operations described above. As another example, the base station 105 may perform one or more aspects as described below.

In a first aspect, the wireless communication device comprises a base station; receiving the NACK and transmitting the second PDSCH are performed during a particular cycle; the NACK is transmitted via a first physical channel of the first frequency band; and the second PDSCH is received via a second physical channel of the second frequency band.

In a second aspect, alone or in combination with one or more of the above aspects, the first frequency band and the second frequency band are adjacent bands.

In a third aspect, alone or in combination with one or more of the above aspects, the first frequency band and the second frequency band are discontinuous bands.

In a fourth aspect, alone or in combination with one or more of the above aspects, the first frequency band and the second frequency band are in the same frequency range.

In a fifth aspect, alone or in combination with one or more of the above aspects, the first frequency band is in a first frequency range, and wherein the second frequency band is in a second frequency range different from the first frequency range.

In a sixth aspect, alone or in combination with one or more of the above aspects, the first frequency range comprises a millimeter wave frequency range, and wherein the second frequency range comprises a non-millimeter wave frequency range.

In a seventh aspect, alone or in combination with one or more of the above aspects, the first PDSCH and the second PDSCH have the same transport block (TB), the same code block group (CBG), the same HARQ ID, or a combination thereof.

In an eighth aspect, alone or in combination with one or more of the above aspects, prior to receiving the NACK, the base station 105 transmits, during the particular cycle, a first Physical Downlink Common Channel (PDCCH) indicating the first PDSCH, and transmits, during the particular cycle, the first PDSCH, where the NACK indicates unsuccessful decoding of the first PDSCH by the UE.

In a ninth aspect, alone or in combination with one or more of the above aspects, the first PDSCH is transmitted via a third physical channel of the first frequency band for the first PDSCH.

In a tenth aspect, alone or in combination with one or more of the above aspects, the first PDSCH is transmitted via the first physical channel of the first frequency band for the first PDSCH.

In an eleventh aspect, alone or in combination with one or more of the above aspects, prior to transmitting the second PDSCH, the base station 105 transmits a second PDDCH indicating the second PDSCH.

In a twelfth aspect, alone or in combination with one or more of the above aspects, after transmitting the second PDSCH, the base station 105 receives an acknowledgement message for the second PDSCH on a fourth physical channel of the second frequency band, the acknowledgement message indicating that the UE successfully received the second PDSCH.

In a thirteenth aspect, alone or in combination with one or more of the above aspects, after transmitting the second PDSCH, the base station 105 receives an acknowledgement message for the second PDSCH on the second physical channel, the acknowledgement message indicating that the UE successfully received the second PDSCH.

In a fourteenth aspect, alone or in combination with one or more of the above aspects, each physical channel corresponds to a component carrier (CC), and wherein each frequency channel of each frequency band has same Cell ID.

In a fifteenth aspect, alone or in combination with one or more of the above aspects, each frequency band has a plurality of corresponding channels, wherein each frequency channel of each frequency band has the same set of HARQ IDs, wherein the plurality of channels have the same active bandwidth part configuration.

In a sixteenth aspect, alone or in combination with one or more of the above aspects, each frequency band has a plurality of corresponding channels, wherein each frequency channel of each frequency band has the same set of HARQ IDs, wherein the plurality of channels have two or more active bandwidth part configurations.

In a seventeenth aspect, alone or in combination with one or more of the above aspects, each physical channel corresponds to a component carrier (CC), and wherein each CC of each frequency band has same virtual Cell ID.

In a eighteenth aspect, alone or in combination with one or more of the above aspects, each frequency band has a plurality of corresponding CC's, wherein each CC of each frequency band has the same set of HARQ IDs, wherein the plurality of CCs have the same active bandwidth part configuration.

In a nineteenth aspect, alone or in combination with one or more of the above aspects, each frequency band has a plurality of corresponding CC's, wherein each CC of each frequency band has the same set of HARQ IDs, wherein the plurality of CCs have two or more active bandwidth part configurations.

In a twentieth aspect, alone or in combination with one or more of the above aspects, the base station operates in a same Cell ID mode in the first cycle, and further comprising, in a second cycle, operating, by the base station, in a same virtual Cell ID mode different from the same Cell ID mode.

In a twenty-first aspect, alone or in combination with one or more of the above aspects, prior to receiving the first PDSCH, the base station 105 receives a message indicating that the UE is configured for unified HARD ID for cross carrier retransmission on different bands.

Accordingly, the gNB and the UE may use another physical channel of another frequency band to perform retransmission. Thus, latency and overhead are reduced and throughput and reliability are increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 7 and 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers.

Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   transmitting, by a wireless communication device, a negative acknowledgement message (NACK) for a first Physical Downlink Shared Channel (PDSCH) and via a first frequency band; and
   receiving, by the wireless communication device, a second PDSCH via a second frequency band, wherein the first frequency band is different from the second frequency band, wherein transmitting the NACK and receiving the second PDSCH are performed during a particular cycle, and wherein the first PDSCH and the second PDSCH have a same transport block (TB), a same code block group (CBG), and a same HARQ ID.

2. The method of claim 1, wherein:
   the wireless communication device comprises a user equipment (UE);
   the NACK is transmitted via a first physical channel of the first frequency band; and
   the second PDSCH is received via a second physical channel of the second frequency band.

3. The method of claim 1, wherein the first frequency band has a first subcarrier spacing (SCS) that is different from a second SCS of the second frequency band.

4. The method of claim 1, wherein the particular cycle corresponds to a subframe of a radio frame.

5. The method of claim 1, wherein each physical channel corresponds to a frequency channel, wherein each frequency channel of each frequency band has a same Cell ID, wherein each frequency band has a plurality of corresponding channels, wherein each frequency channel of each frequency band has a same set of HARQ IDs, and wherein the plurality of channels have a same active bandwidth part configuration or have two or more active bandwidth part configurations.

6. The method of claim 1, wherein each physical channel corresponds to a component carrier (CC), wherein each CC of each frequency band has a same virtual Cell ID, wherein each frequency band has a plurality of corresponding CC's, wherein each CC of each frequency band has a same set of HARQ IDs, and wherein the plurality of CCs have a same active bandwidth part configuration or have two or more active bandwidth part configurations.

7. The method of claim 2, wherein:
   the first frequency band and the second frequency band are adjacent bands, are discontinuous bands, are in a same frequency range;
   the first frequency band and the second frequency band are adjacent bands, are discontinuous bands are in different frequency ranges; or
   the first frequency band is in a first frequency range that comprises a millimeter wave frequency range, and wherein the second frequency band is in a second frequency range that comprises a non-millimeter wave frequency range.

8. The method of claim 2, further comprising, prior to receiving the second PDSCH:
   receiving, by the UE during the particular cycle, a first Physical Downlink Common Channel (PDCCH) indicating the first PDSCH;
   monitoring, by the UE, the first physical channel or a third physical channel of the first frequency band for the first PDSCH; and
   unsuccessfully decoding, by the UE, the first PDSCH.

9. The method of claim 2, further comprising:
   receiving, by the UE prior to receiving the second PDSCH, a second PDCCH indicating the second PDSCH;
   successfully decoding, by the UE, the second PDSCH; and
   transmitting, by the UE, an acknowledgement message for the second PDSCH on the second physical channel or on a fourth physical channel of the second frequency band.

10. An apparatus configured for wireless communication, the apparatus comprising:
    at least one processor; and
    a memory coupled to the at least one processor,
    wherein the at least one processor is configured to cause a wireless communication device to:
      transmit a negative acknowledgement message (NACK) for a first Physical Downlink Shared Channel (PDSCH) and via a first frequency band; and
      receive a second PDSCH via a second frequency band, wherein the first frequency band is different from the second frequency band, wherein transmitting the NACK and receiving the second PDSCH are performed during a particular cycle, and wherein the first PDSCH and the second PDSCH have a same transport block (TB), a same code block group (CBG), and a same HARQ ID.

11. The apparatus of claim 10, wherein:
    the wireless communication device comprises a user equipment (UE);
    the at least one processor is configured to cause a wireless communication device to:
      transmit the NACK via a first physical channel of the first frequency band; and
      receive the second PDSCH via a second physical channel of the second frequency band.

12. The apparatus of claim 10, wherein the first frequency band has a first subcarrier spacing (SCS) that is different from a second SCS of the second frequency band.

13. The apparatus of claim 10, wherein the particular cycle corresponds to a subframe of a radio frame.

14. The apparatus of claim 10, wherein:
the first frequency band and the second frequency band are adjacent bands; the first frequency band and the second frequency band are discontinuous bands;
the first frequency band and the second frequency band are in the same frequency range;
the first frequency band and the second frequency band are in different frequency ranges; or
the first frequency band is in a first frequency range that comprises a millimeter wave frequency range and wherein the second frequency band is in a second frequency range that comprises a non-millimeter wave frequency range.

15. The apparatus of claim 10, wherein, prior to reception of the second PDSCH, the at least one processor is configured to cause a wireless communication device to:
receive, during the particular cycle, a first Physical Downlink Common Channel (PDCCH) indicating the first PDSCH;
monitor the first physical channel or a third physical channel of the first frequency band for the first PDSCH; and
unsuccessfully decode the first PDSCH.

16. The apparatus of claim 10, wherein the at least one processor is configured to cause a wireless communication device to:
receive, prior to reception of the second PDSCH, a second PDCCH indicating the second PDSCH;
successfully decode the second PDSCH; and
transmit an acknowledgement message for the second PDSCH on the second physical channel or on a fourth physical channel of the second frequency band.

17. The apparatus of claim 11, wherein each physical channel corresponds to a frequency channel, wherein each frequency channel of each frequency band has a same Cell ID, wherein each frequency band has a plurality of corresponding channels, wherein each frequency channel of each frequency band has a same set of HARQ IDs, and wherein the plurality of channels have a same active bandwidth part configuration or have two or more active bandwidth part configurations.

18. The apparatus of claim 11, wherein each physical channel corresponds to a component carrier (CC), wherein each CC of each frequency band has a same virtual Cell ID, wherein each frequency band has a plurality of corresponding CC's, wherein each CC of each frequency band has a same set of HARQ IDs, and wherein the plurality of CCs have a same active bandwidth part configuration or have two or more active bandwidth part configurations.

19. A method of wireless communication comprising:
receiving, by a wireless communication device, a negative acknowledgement message (NACK) for a first Physical Downlink Shared Channel (PDSCH) and via a first frequency band; and
transmitting, by the wireless communication device, a second PDSCH via a second frequency band, wherein the first frequency band is different from the second frequency band, and wherein receiving the NACK and transmitting the second PDSCH are performed during a particular cycle, and wherein the first PDSCH and the second PDSCH have a same transport block (TB), a same code block group (CBG), and a same HARQ ID.

20. The method of claim 19, wherein:
the wireless communication device comprises a base station;
the NACK is received via a first physical channel of the first frequency band;
the second PDSCH is transmitted via a second physical channel of the second frequency band;
the first frequency band is in a first frequency range that comprises a millimeter wave frequency range; and
the second frequency band is in a second frequency range that comprises a non-millimeter wave frequency range.

21. The method of claim 20, wherein the NACK indicates unsuccessful decoding of the first PDSCH by a user equipment (UE), and further comprising, prior to receiving the NACK:
transmitting, by the base station during the particular cycle, a first Physical Downlink Common Channel (PDCCH) indicating the first PDSCH; and
transmitting, by the base station during the particular cycle, the first PDSCH via the first physical channel of the first frequency band or via a third physical channel of the first frequency band.

22. The method of claim 20, further comprising:
transmitting, by the base station prior to transmitting the second PDSCH, a second PDCCH indicating the second PDSCH; and
receiving, by the base station after transmitting the second PDSCH, an acknowledgement message for the second PDSCH on a fourth physical channel of the second frequency band or on the second physical channel, the acknowledgement message indicating that a user equipment (UE) successfully received the second PDSCH.

23. The method of claim 20, wherein each physical channel corresponds to a component carrier (CC), and wherein each frequency channel of each frequency band has a same Cell ID, wherein each frequency band has a plurality of corresponding channels, wherein each frequency channel of each frequency band has a same set of HARQ IDs, and wherein the plurality of channels have a same active bandwidth part configuration or have two or more active bandwidth part configurations.

24. The method of claim 20, wherein each physical channel corresponds to a component carrier (CC), and wherein each CC of each frequency band has a same virtual Cell ID, wherein each frequency band has a plurality of corresponding CC's, wherein each CC of each frequency band has a same set of HARQ IDs, and wherein the plurality of CCs have a same active bandwidth part configuration or have two or more active bandwidth part configurations.

25. An apparatus configured for wireless communication, the apparatus comprising:
at least one processor; and
a memory coupled to the at least one processor,
wherein the at least one processor is configured to cause a wireless communication device to:
receive a negative acknowledgement message (NACK) for a first Physical Downlink Shared Channel (PDSCH) and via a first frequency band; and
transmit a second PDSCH via a second frequency band, wherein the first frequency band is different from the second frequency band, wherein receiving the NACK and transmitting the second PDSCH are performed during a particular cycle, and wherein the first PDSCH and the second PDSCH have a same transport block (TB), a same code block group (CBG), and a same HARQ ID.

26. The apparatus of claim 25, wherein:
the wireless communication device comprises a base station;
the at least one processor is configured to cause a wireless communication device to:

receive the NACK via a first physical channel of the first frequency band; and transmit the second PDSCH via a second physical channel of the second frequency band.

27. The apparatus of claim 25, wherein the NACK indicates unsuccessful decoding of the first PDSCH by a user equipment (UE), and wherein, prior to receiving the NACK, the at least one processor is configured to cause a wireless communication device to:

transmit, during the particular cycle, a first Physical Downlink Common Channel (PDCCH) indicating the first PDSCH; and transmit, during the particular cycle, the first PDSCH via the first physical channel of the first frequency band or via a third physical channel of the first frequency band.

28. The apparatus of claim 25, wherein the at least one processor is configured to cause a wireless communication device to:

transmit, prior to transmitting the second PDSCH, a second PDCCH indicating the second PDSCH; and receive, after transmitting the second PDSCH, an acknowledgement message for the second PDSCH on a fourth physical channel of the second frequency band or on the second physical channel, the acknowledgement message indicating that a user equipment (UE) successfully received the second PDSCH.

29. The apparatus of claim 26, wherein each physical channel corresponds to a component carrier (CC), and wherein each frequency channel of each frequency band has a same Cell ID, wherein each frequency band has a plurality of corresponding channels, wherein each frequency channel of each frequency band has a same set of HARQ IDs, and wherein the plurality of channels have a same active bandwidth part configuration or have two or more active bandwidth part configurations.

30. The apparatus of claim 26, wherein each physical channel corresponds to a component carrier (CC), and wherein each CC of each frequency band has a same virtual Cell ID, wherein each frequency band has a plurality of corresponding CC's, wherein each CC of each frequency band has a same set of HARQ IDs, and wherein the plurality of CCs have a same active bandwidth part configuration or have two or more active bandwidth part configurations.

* * * * *